United States Patent [19]

Gopp

[11] Patent Number: 5,319,921
[45] Date of Patent: Jun. 14, 1994

[54] CATALYTIC CONVERTER EFFICIENCY MONITORING

[75] Inventor: Alexander Y. Gopp, Ann Arbor, Mich.

[73] Assignee: Ford Motor Company, Dearborn, Mich.

[21] Appl. No.: 924,813

[22] Filed: Aug. 4, 1992

[51] Int. Cl.⁵ ............................................. F01N 3/20
[52] U.S. Cl. ..................................... 60/274; 60/276; 60/277; 60/285; 123/691
[58] Field of Search ................ 60/274, 276, 277, 285; 123/691

[56] References Cited

U.S. PATENT DOCUMENTS

| | | |
|---|---|---|
| 3,939,654 | 2/1976 | Creps . |
| 3,962,866 | 6/1976 | Neidhard et al. . |
| 3,969,932 | 7/1976 | Rieger et al. . |
| 4,007,589 | 2/1977 | Neidhard et al. . |
| 4,027,477 | 6/1977 | Storey . |
| 4,121,548 | 10/1978 | Hattori et al. . |
| 4,251,990 | 2/1981 | Norimatsu et al. . |
| 4,622,809 | 11/1986 | Abthoff et al. . |
| 4,831,838 | 5/1989 | Nagai et al. . |
| 4,840,027 | 6/1989 | Okumura . |
| 5,077,970 | 1/1992 | Hamburg . |

FOREIGN PATENT DOCUMENTS

| | | |
|---|---|---|
| 6445913 | 2/1989 | Japan . |
| 2178857 | 2/1987 | United Kingdom . |

OTHER PUBLICATIONS

Clemens et al –SAE Technical Paper 900062, Detection of Catalyst Performance Loss Using On–Board Diagnostics, Feb. 26–Mar. 2, 1990.

*Primary Examiner*—Douglas Hart
*Attorney, Agent, or Firm*—Joseph W. Malleck; Roger L. May

[57] ABSTRACT

Apparatus and method are disclosed for monitoring catalytic converter efficiency in treating exhaust gas from an internal combustion engine having fuel control means for controlling the air/fuel ratio at which fuel is supplied to the engine in response to a fuel flow control signal. During normal operation mode, control signal means generate the fuel flow control signal based at least in part on output signals from first and second EGO sensors exposed to the exhaust gas upstream and downstream, respectively, of the catalytic converter. During a test operation mode, preferably initiated and carried out during substantially steady state or normal operation of the engine, the output signal from the upstream EGO sensor is replaced by a zero mean value periodic function test signal. The output signal of the second (i.e., downstream) EGO sensor is compared to a stored value corresponding to minimum acceptable efficacy of the catalytic converter. For example, a value may be pre-stored and compared to the integral over the test interval of the absolute value of signal deviation from stoichiometry, preferably weighted or normalized, e.g., by dividing it by the integral over the test interval of the absolute value of fuel pulse width deviation from steady state. A failure signal is generated when the comparison indicates efficacy below the minimum acceptable level.

10 Claims, 6 Drawing Sheets

CATALYTIC CONVERTER EFFICIENCY MONITORING

FIELD OF THE INVENTION

This invention relates to monitoring of catalytic converter efficiency in treating exhaust gas from an internal combustion engine. In particular, the invention relates to air/fuel ratio closed loop fuel control of an internal combustion engine equipped with an exhaust gas oxygen (EGO) sensor located downstream of the catalytic converter, with on-board monitoring of the efficiency of the catalytic converter.

BACKGROUND OF THE INVENTION

It is known that the efficiency or efficacy of a catalytic converter treating the exhaust gas of an engine is significantly effected by the ratio of air to fuel supplied to the engine. At stoichiometric ratio, catalytic conversion efficiency is high for both oxidation and reduction conversions. The air/fuel stoichiometric ratio is defined as the ratio of air to fuel which in perfect combustion would yield complete consumption of the fuel. The air/fuel ratio LAMBDA of an air/fuel mixture is the ratio of (a) the amount by weight of air divided by the amount by weight of fuel, to (b) the air/fuel stoichiometric ratio. Closed loop fuel control systems are known for use in keeping the air/fuel ratio in a narrow range about the stoichiometric ratio, known as a conversion window.

It is known that the efficiency of catalytic conversion is affected by the oxygen storage capability of the catalytic converter. A properly operating catalytic converter dampens oxygen concentration fluctuations in the exhaust stream. A system proposed in SAE paper No. 900062, Detection of Catalyst Performance Using On-Board Diagnostics, employs two exhaust gas oxygen sensors, one upstream and one downstream of the catalytic converter, to detect oxygen content in the exhaust gas The system employs test signals in the form of an air/fuel ratio swing on both sides of stoichiometry at predetermined rates or frequencies caused by fuel control system perturbations. By comparing the change in response patterns between the upstream and downstream EGO sensors, a determination can be made about catalytic converter efficacy. In such system the monitoring results depend on signals from two EGO sensors which may have different characteristics, due either to manufacturing tolerances or to differential aging over a period of use, leading to possible errors in the results.

Accordingly, it is desirable to have a catalytic converter monitoring system and method which are reliable and do not depend on signals from both upstream and downstream EGO sensors. It is particularly desirable to incorporate such monitoring system and method in a fuel control system utilizing both upstream and downstream EGO sensors.

SUMMARY OF THE INVENTION

According to a first aspect of the invention, an apparatus is provided for monitoring catalytic converter efficiency in treating exhaust gas from an internal combustion engine. The apparatus includes a catalytic converter and an exhaust gas conduit for passing exhaust gas from the catalytic converter. Fuel control means are provided for controlling the air/fuel ratio at which fuel is supplied to the engine in response to a fuel flow control signal. The fuel flow control signal is generated by control signal means based, at least in part, on the output signal from an EGO sensor exposed to the exhaust gas downstream of the catalytic converter and a zero mean value periodic function test signal When the control system locks up with the test signal, the frequency of the limit cycle then being equal to that of the test signal, the EGO sensor output signal is compared to a stored value corresponding to the minimum acceptable efficiency of the catalytic converter. A failure signal is generated or other action initiated when the comparison indicates catalytic converter efficiency below a minimum acceptable level.

According to a second aspect of the invention, the aforesaid apparatus and method for monitoring the catalytic converter are incorporated as part of a system for controlling the air/fuel ratio for the engine, for treatment of exhaust gas from the engine, and for periodically monitoring catalytic converter efficacy in the treatment of the exhaust gas. Such apparatus and method has a normal operation mode and a test operation mode. It comprises fuel control means for controlling the air/fuel ratio at which fuel is supplied to the engine in response to a fuel flow control signal both during normal operation mode and during test operation mode. A first EGO sensor means mounted to the exhaust system for exposure to the upstream exhaust gas generates a first EGO signal having a value corresponding to the oxygen content level in the upstream exhaust gas A second EGO sensor means mounted for exposure to the downstream exhaust gas generates a second EGO signal having a value corresponding to the oxygen content level in the downstream exhaust gas. Preferably the apparatus further comprises microprocessor means comprising a first signal processing means which generates a first signal based on a comparison of the first EGO signal and a first reference signal corresponding to the value of the first EGO signal under stoichiometric air/fuel ratio conditions. Thus, the first signal is indicative of the condition of the upstream exhaust gas. A second signal processing means generates a second signal based on a comparison of the second EGO signal and a second reference signal corresponding to the value of the second EGO signal at stoichiometric air/fuel ratio. Thus, the second signal is indicative of the condition of the downstream exhaust gas. Summing block means of the microprocessor operates, during normal operation mode, to receive signals including at least the first signal and the second signal to generate an output SUM signal. In test operation mode the summing block generates the SUM signal based on the second signal plus, in place of the first signal, a zero mean value periodic function test signal generated by a test signal generator. Proportional and integral controller means generates a LAMCOR signal, based at least on the sum signal and corresponding to a desired air/fuel ratio correction amount for the fuel mixture being fed to the engine. Fuel flow calculation means generate the aforesaid fuel flow control signal to the fuel control means, based at least in part on the LAMCOR signal. As described above, comparison means are provided for conducting a comparison of a value of the second output signal during test operation mode to a stored value corresponding to the minimum acceptable efficacy of the catalytic converter. A failure signal is generated when the comparison indicates catalytic converter efficacy below the minimum acceptable level. After completion of the test mode, the test signal is replaced by the first EGO signal corresponding to the condition of the upstream exhaust gas for fuel control in the normal operation mode.

Preferred embodiments of the invention provide significant advantages, particularly with respect to on-board monitoring of the efficiency of a catalytic converter, such as a three way catalyst type catalytic converter installed on a vehicle to reduce emissions of HC, CO and $NO_x$ from the vehicle's engine. Such preferred embodiments, discussed in greater detail below, provide the advantages of a dual EGO closed loop fuel control system with an on-board catalytic converter monitoring system which is unaffected by differences due to manufacturing tolerances, aging, etc. between the upstream and downstream EGO sensors. Additional features and advantages of various preferred embodiments will be better understood in view of the following disclosure and detailed description.

BRIEF DESCRIPTION OF THE DRAWINGS

Various preferred embodiments of the invention are described below with reference to the accompanying drawings wherein.

DETAILED DESCRIPTION OF CERTAIN PREFERRED EMBODIMENTS

Figure 1:
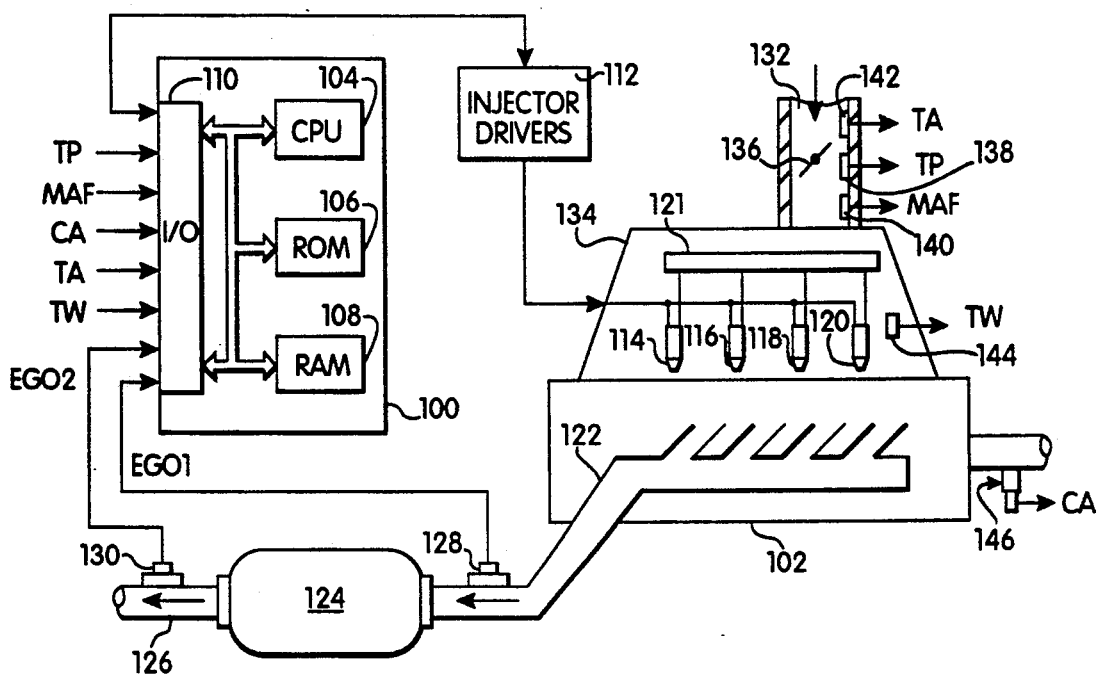
FIG. 1 is a schematic view of a motor vehicle internal combustion engine together with apparatus for controlling the air/fuel ratio of the air and fuel mixture to the engine, for treatment of the exhaust gas from the engine, and for periodically monitoring catalytic converter efficacy in the treatment of the exhaust gas in accordance with a preferred embodiment of the invention.

Those skilled in the art will understand from the foregoing disclosure that the present invention may be embodied in apparatus, method and system for on-board monitoring or diagnosis of the efficacy of a catalytic converter treating exhaust gas from an internal combustion engine. The terms "efficacy" and "efficiency" are used here interchangeably to mean any suitable measure or evaluation of the effectiveness of the catalytic converter in treating the exhaust gas.

The aforesaid catalytic converter monitoring is most advantageously implemented in embodiments comprising a closed loop fuel control system utilizing both an upstream and a downstream EGO sensor in the normal fuel control mode. Accordingly, the detailed description which follows will focus on such dual EGO fuel control system embodiments of the invention. Various alternative closed loop fuel control systems are known which can be readily employed with the catalytic converter monitoring feature disclosed herein.

A preferred dual EGO fuel control system for an internal combustion engine is disclosed in U.S. Pat. No. 5,115,639 issued May 26, 1992 to A. Y. Gopp, the disclosure of which is incorporated herein by reference. In the Gopp control system, a single PI controller is employed, the output of which is based on input signals including, at least, output signals from both an upstream and a downstream EGO sensor. The upstream EGO sensor signal is processed through a high pass filter which acts as a real time differentiator. The upstream EGO sensor signal, thus processed, is constantly shifting back and forth in a limit cycle pattern between rich and lean air/fuel ratio, a lean signal from the EGO1 sensor causing the control system to provide a richer air/fuel feed to the engine and the eventually resulting rich signal sending the air/fuel feed back to the lean side of stoichiometry. The downstream EGO sensor signal is used to adjust or trim the upstream closed loop control, making the limit cycle asymmetrical about its reference voltage, REF 1.

For purposes of illustration and not limitation, the preferred embodiments disclosed and discussed below incorporate dual EGO fuel control apparatus, methods and systems in accordance with such teachings of the A. Y. Gopp patent to provide dual EGO fuel control for an internal combustion engine with additional and modified features to provide the on-board catalytic converter monitoring aspect of the present invention. In such preferred embodiments, as described in detail below, an internal combustion engine is provided with a catalytic converter and two switch-type EGO sensors, one upstream and the other downstream of the converter. The fuel control system includes a first comparator for generating a first signal from the output signal of the upstream EGO sensor. Such first signal has a constant absolute value (e.g., "one") but varies in sign as a function of the upstream EGO sensor output signal. A second comparator, or alternatively limiting means, generates a second signal as a function of the downstream EGO sensor signal. The second signal also has a constant absolute value, varying in sign as a function of the downstream EGO sensor output signal. Corrective means comprising a high pass filter responsive to the first signal generates a third signal. Means to combine the scaled second signal with the third signal generate a fourth signal and control means using a PI controller responsive to the fourth signal generates an air/fuel ratio correction signal. Preferably the control system further provides means for open loop control of the air/fuel mixture, independent of the EGO sensor output signals, during certain periods, for example, initial engine operation while one or both EGO sensors have not reached operational temperature. The system has a normal operation mode and, in accordance with a preferred on-board catalytic converter monitoring aspect of the present invention, a test operation mode. During the latter mode, the processed signal from the upstream EGO sensor is replaced by a periodic function test signal, such as a sinusoidal or triangle wave or pulse train, having a frequency higher than the natural frequency of a limit cycle which would be generated by the fuel control based solely on the downstream EGO sensor signal The control system locks into the test signal frequency, i.e., the new limit cycle frequency becomes equal to the frequency of the test signal. The output of the downstream EGO sensor is then evaluated over the test interval, for example by integral of an absolute value of EGO sensor deviation from stoichiometry. This function preferably is normalized for engine operating conditions during the test interval, i.e., weighted by another function such as, for example, an integral over the test interval of an absolute value of fuel pulse deviation from steady state due to fuel control actions or an absolute value of air/fuel ratio controller output deviation from steady state. The resulting value represents the catalytic converter condition and is compared with a predetermined stored value which corresponds to a minimum acceptable efficiency. A failure signal is generated or other action taken if the comparison indicates catalytic converter efficiency below the borderline level.

Referring to FIG. 1, microcomputer 100 is shown for controlling an air/fuel ratio supplied to an internal combustion engine 102. Microcomputer 100 comprises a central processing unit (CPU) 104, a read-only memory (ROM) 106 for storing a main engine control routine and other routines such as a fuel flow routine, calibration constants, look-up tables, etc., a random access memory (RAM) 108, and a conventional input/output (I/O) interface 110. Interface 110 includes analog to digital (A/D) converters for converting various analog input signals, digital inputs, digital to analog (D/A) converters for converting various digital outputs, and digital outputs.

Microcomputer 100 also includes other conventional elements, such as a clock generator and means for generating various clock signals, counters, drivers, and the like. Microcomputer 100 controls the air/fuel ratio by actuating injector drivers 112 in response to operator actions and various operating conditions and parameters of engine 102. Microcomputer 100 fetches input signals parameters and performs calculations of control signals at a fixed sampling interval DELTAT ($\Delta$T) such as, for example, 20 msec. If microcomputer 100 is designed to operate with a variable sampling rate, a timer which can perform time measurement between two successive samplings and assign a measured sampling time DELTAT should be provided.

Engine 102, in this particular example, is shown as a conventional four cylinder gasoline engine having fuel injectors 114, 116, 118 and 120 coupled to a fuel rail 121. Each fuel injector is electronically activated by respective signals from injector driver 112. Each of the injectors 114, 116, 118 and 120 is also coupled in a conventional manner to a respective combustion cylinder. Exhaust gases from the combustion cylinder are routed to an exhaust manifold 122 and are discharged through a three-way catalytic converter 124 which removes CO, HC and $NO_x$ pollutants from the exhaust gas, and exhaust pipe 126. In the exhaust manifold 122, upstream of the converter 124, is a first EGO sensor 128 (EGO1) for detecting oxygen concentration in the engine exhaust gases. In the exhaust pipe 126, downstream of the converter 124, is a second EGO sensor 130 (EGO2) for detecting oxygen concentration after converter 124. Both EGO sensors 128 and 130 generate output voltage signals which are transmitted to the analog to digital converter of I/O interface 110. Various suitable alternative EGO sensors are known and will be apparent to those skilled in the art, including heated EGO (HEGO) sensors, etc. In that regard, the discussion of exemplary suitable EGO sensors in U.S. Pat. No. 5,077,970 to Hamburg is incorporated herein by reference.

Air intake 132 is shown coupled to intake manifold 134 for inducting air past throttle plate 136 into the combustion cylinders. Throttle position sensor 138 is coupled to throttle plate 136 for providing a throttle position signal TP. Also coupled to intake manifold 134 are mass airflow sensor 140 for providing mass airflow signal MAF corresponding to the mass of the airflow induced into engine, and air temperature sensor 142 for providing a signal TA indicative of the temperature of the induced air. Coupled to the cylinder block of engine 102 is a cooling water temperature sensor 144 for providing signal TW indicative of the engine coolant temperature. Crank angle position sensor 146 is coupled to the crankshaft of engine 102 for providing crank angle position signal CA indicative of crank position.

A manifold pressure sensor MAP may be used instead of a mass airflow sensor 140 to provide an indication of engine load by known techniques. Other conventional components necessary for engine operation, such as a spark delivery system are not shown in FIG. 1. It is also recognized that the invention may be used to advantage with other types of engines, such as engines having a number of cylinders other than four, rotary engines, etc.

Figure 2:
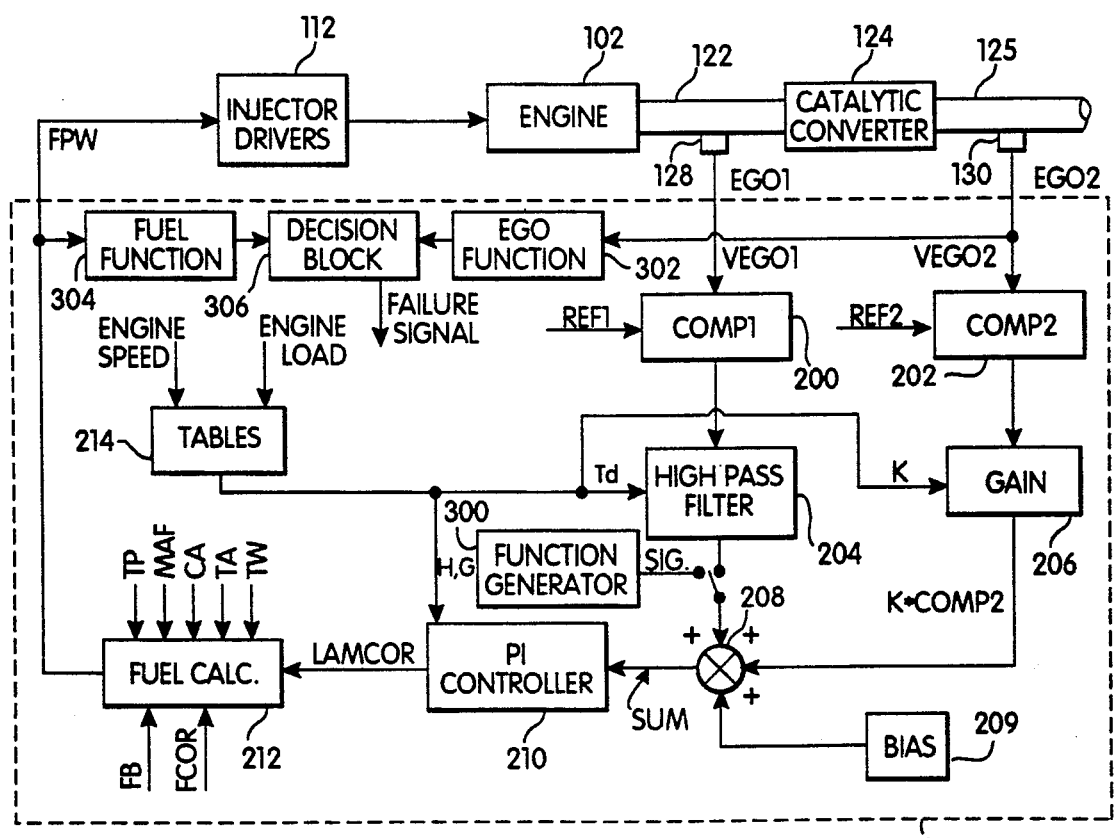
FIG. 2 is a control block diagram of the fuel control, exhaust treatment and monitoring system of the embodiment of FIG. 1.
Figure 3:
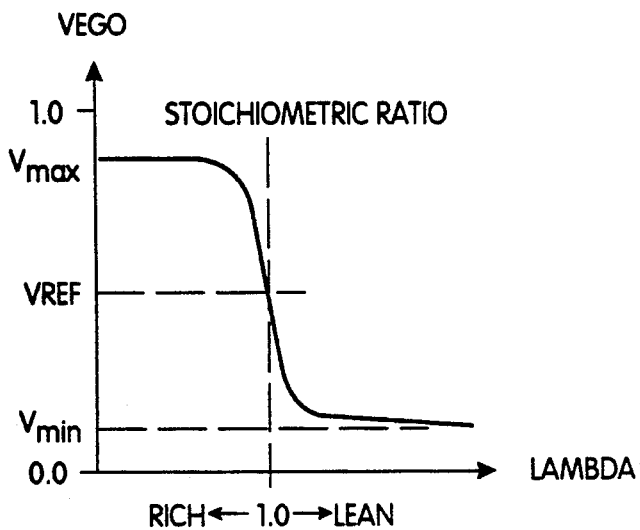
FIG. 3 is a graph showing voltage output of an EGO sensor as a function of the air/fuel ratio LAMBDA.

The operation of a dual EGO sensor closed loop fuel control system in controlling air/fuel ratio is now described with particular reference to a control block diagram shown in FIG. 2 and the associated graph in FIG. 3 showing the EGO sensor output voltage VEGO as a function of LAMBDA, the air/fuel ratio relative to air/fuel stoichiometric ratio.

Output voltages VEGO1 and VEGO2 from upstream EGO1 sensor 128 and downstream EGO2 sensor 130, respectively, are fed through an A/D converter in I/O device 110 to respective comparators 200 and 202. Each comparator is supplied with reference signals REF1 and REF2, respectively, corresponding to EGO output voltage at stoichiometric ratio, VREF, as shown in FIG. 3. Each comparator 200 and 202 produces an output signal COMP1 and COMP2, respectively, having a constant absolute value, but varying in sign depending upon which side of stoichiometric ratio the corresponding EGO output voltage signal, VEGO1 and VEGO2, respectively, is.

The output COMP1 of comparator 200 is modified by a corrective block 204. Corrective block 204 is preferably a high pass filter which in this embodiment is presented as a first order high pass filter, but may be a higher order high pass filter. The first order high pass filter, also known in the control field as a real time differentiator, may be described by the following differential equation:

$$T_d*d(DIF)/dt + DIF = d(COMP1)/dt \qquad \text{(Eqn. 1)}$$

where:
DIF = the first order high pass filter output signal;
$T_d$ = time constant of the filter, a calibratable parameter of the control system; and $d(\ldots)/dt$ = symbol indicating the first derivative of the respective signal.

The difference equation suited for digital microcomputer computations is derived from (Eqn. 1) and in the simplest form is:

$$DIF(i) = \left(\frac{1-DELTAT}{T_1} \cdot \right) DIF(i-1) + COMP1(i) - COMP1(i-1))$$

where:
DELTAT = microcomputer sampling interval discussed above; i and i−1 indicate current and previous results of calculations or measurements.

The output COMP2 of the second comparator 202 is connected to gain block 206 with a constant gain K, so that output signal of comparator 202 is equal to K*COMP2. During normal operating mode, output signals of both comparators 200 and 202 are summed together with an additional bias signal BIAS by a summing block 208. The bias signal 209 is provided for calibration purposes, serving in effect to modify reference signal REF2 if desired. The output signal SUM of the summing block is calculated as follows:

$$SUM = DIF + K^*COMP2 + BIAS \quad \text{(Eqn. 2)}$$

The SUM signal is fed to a controller block 210. Controller block 210 is preferably a proportional and integral (PI) controller, performing calculations described by the following differential equation:

$$d(LAMCOR)/dt = H^*d(SUM)/dt + G^*SUM \quad \text{(Eqn. 2)}$$

where:
LAMCOR is the output signal of the PI controller and represents an air/fuel ratio correction amount; and
H and G are jumpback and ramp, respectively, of the PI controller, calibratable parameters of the control system.

A difference equation suited for digital microcomputer computations is derived from (Eqn. 3) and in the simplest form is: LAMCOR(i)=LAMCOR(i−1)+H*·(SUM(i)−SUM(i−1))+G*DELTAT*SUM(i−1).

Those skilled in the art will recognize that presentation of the differential equations (Eqn. 1) and (Eqn. 3) in the form of the difference equations may be done in different form. Control system calibratable parameters H, G, K. and Td may be modified as a function of speed/load tables (214). Also, though this description is related to microcomputer realization, the control system also can be implemented by analog means.

Fuel calculation block 212 calculates fuel flow rate FPW, a control signal to the injector drivers 112, in a conventional manner using the air/fuel correction amount signal LAMCOR from PI controller 210 as follows:

$$FPQ = FB^*FCOR^*LAMCOR$$

where:
FB is the base open loop fuel flow as a function of engine load/speed table fetched from ROM 106 storage or stored in fuel calculation block 212;
FCOR is a fuel correction amount based, for example, on engine warm-up temperature, battery voltage and the like, also preferably from look-up tables; and
LAMCOR is defined above.

Figure 4:
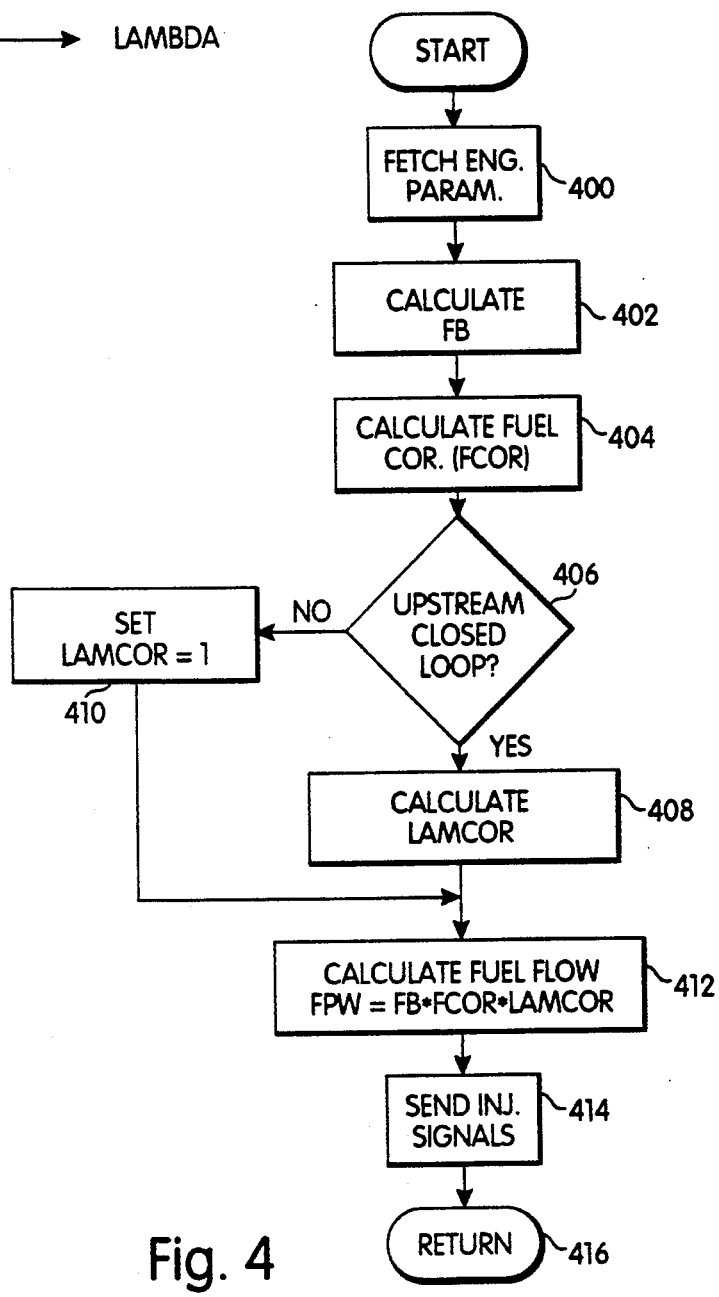
FIG. 4 is a flow chart illustrating process steps performed in calculating fuel flow rate FPW during normal operation mode of the apparatus of FIGS. 1 and 2.

The operation of microcomputer 100 in controlling fuel flow during normal operation mode is now described with particular reference to the flowchart shown in FIG. 4. It will be recognized by those skilled in the art, that the fuel control sub-routine illustrated in FIG. 4 typically will be one of a series of sub-routines performed repeatedly in sequence in the course of engine control, along with, for example, a spark control sub-routine, an EGR sub-routine, etc.

At the start of each sampling interval engine parameters are fetched in step 400. Engine speed and load are then computed in a conventional manner from crank position signal CA and mass airflow signal MAF. During step 402, base open loop fuel injection amount FB is determined by look-up and interpolation of speed/load table from ROM 106 storage. At step 404, fuel correction amount FCOR is calculated based on inputs, for example, intake air temperature TA and cooling water temperature TW, battery voltage, and the like.

Step 406 checks whether upstream EGO sensor 128 is warmed-up sufficiently and/or other conditions are met to start closed loop operation. These conditions may include, but are not limited to, cooling water temperature TW reaching a preselected limit, inlet air temperature TA, observed EGO sensor switching, elapsed time since start, and the like. Also, some engine operations, such as wide open throttle or prolonged idle, may require open loop control even after closed loop conditions are otherwise met. The engine can operate with both upstream open loop and downstream open loop control, that is, the signals from both the upstream EGO sensor and the downstream EGO sensor are disregarded. Typically, this occurs, for example, during cold start-up and/or any time the EGO sensors are not sufficiently heated. If the control system is in upstream open loop control, then in the preferred embodiment here described it will also always be in downstream open loop control. In some conditions, it will have upstream closed loop (i.e., the control system will receive and use the upstream EGO sensor signal) with downstream open loop. This may occur, for example, when the upstream EGO sensor has been sufficiently heated but the downstream EGO sensor has not yet been sufficiently heated, and/or during some hard acceleration conditions, as is well understood by those skilled in the art. Under normal, routine conditions, however, the system will employ upstream closed loop and downstream closed loop control.

If closed loop control is called for, step 408 calculates air/fuel ratio correction amount LAMCOR, the output signal of PI controller 210 representing an air fuel ratio closed loop correction amount. Otherwise, in step 410 LAMCOR is set to 1. The frequency of the limit cycle is mainly determined by parameters of the upstream portion of the control system. However, the downstream EGO sensor provides a bias which makes the limit cycle asymmetrical around its reference voltage REF1. In the same time, the output of downstream EGO2 sensor is centered around its reference voltage REF2. Output LAMCOR of the PI controller exhibits two jumps: the first jump is due to the upstream EGO sensor crossing its reference voltage REF1, and the second jump is due to the downstream EGO sensor crossing its reference voltage REF2. Logic flow from both step 410 and 408 goes to step 412 which calculates a final fuel flow FPW based on the main fuel flow equation given above:

$$FPW = FB \cdot FCOR \cdot LAMCOR$$

and energizes fuel injectors in step 414. Step 416 returns the system from the fuel flow calculation routine to the main routine.

Figure 5:
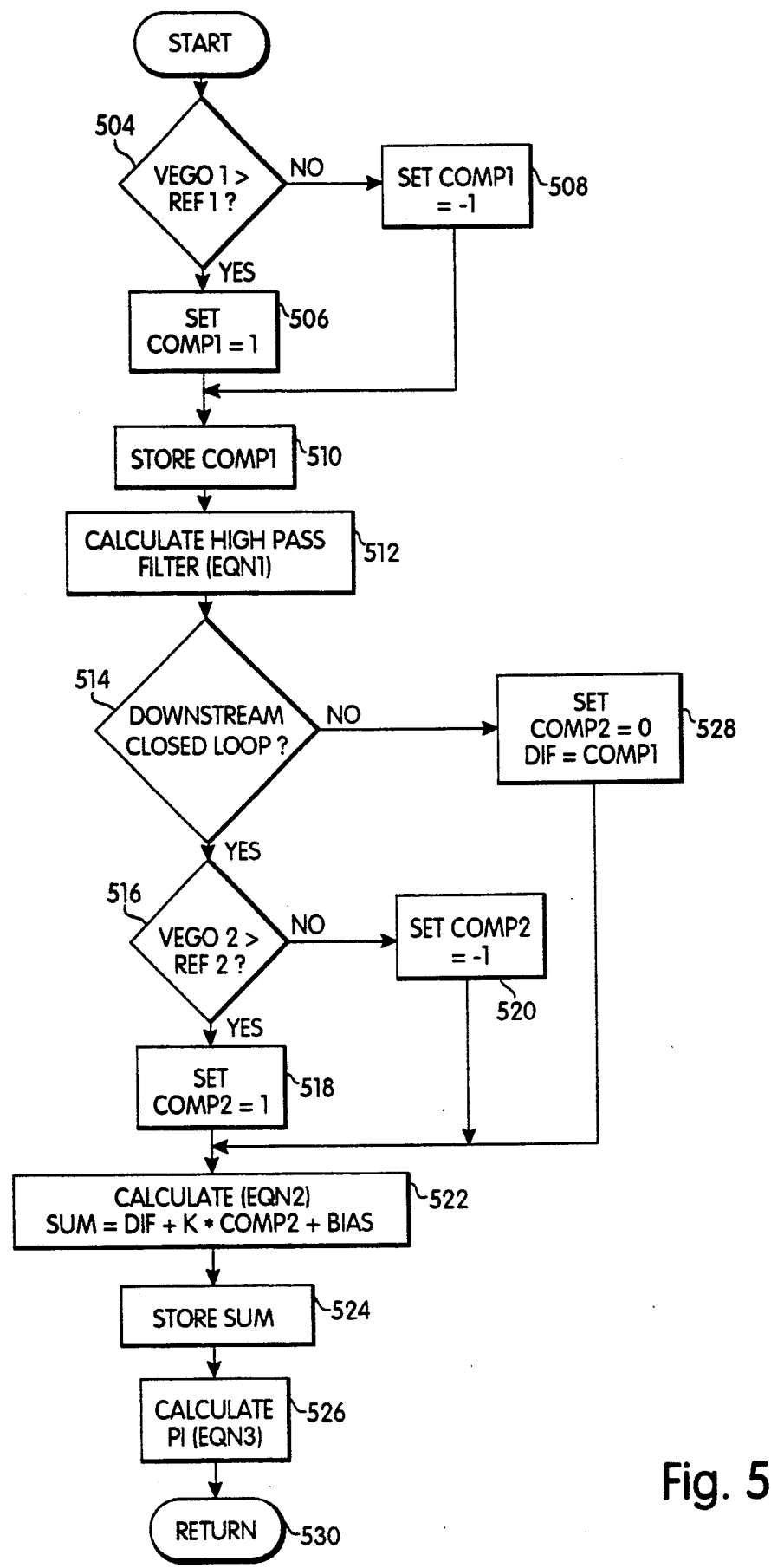
FIG. 5 is a flow chart illustrating process steps performed in calculating the air/fuel ratio correction amount LAMCOR in the preferred embodiment of FIGS. 1 and 2.

The calculation of air/fuel ratio correction amount LAMCOR in step 408 is now described with particular reference to the flowchart shown in FIG. 5. Steps 504, 506, and 508 describe the first comparator 200 and compute its output COMP1. The value of COMP1 is stored in RAM 108 in step 510 for use in the next sampling interval. Step 512 performs computation pertinent to (Eqn. 1) which describes high pass filter 204. Then, step 514 checks whether downstream EGO sensor 130 is warmed up sufficiently and any other requirements are met to start downstream closed loop operation. These conditions are similar to the conditions for upstream closed loop operation discussed above (see step 406). If the conditions are met, steps 516, 518, and 520 compute the output signal COMP2 of the second comparator 202.

Step 522 represents summing block 208 and computes (Eqn. 2). The output value SUM from step 522 is stored in RAM 108 in step 524 for use in the next sampling interval. Step 526 performs computation pertinent to (Eqn. 3) which describes PI controller 210. Step 530 returns this routine to step 412 of the fuel flow calculation. If conditions in step 514 are not met, step 528 sets COMP2 equal to 0, and DIF equal to COMP1, thus disabling the second closed loop operation and high pass filter. Step 528 then proceeds to step 522. Thus, automatic transfer is provided from one EGO to dual EGO sensor closed loop fuel control.

Figure 6:
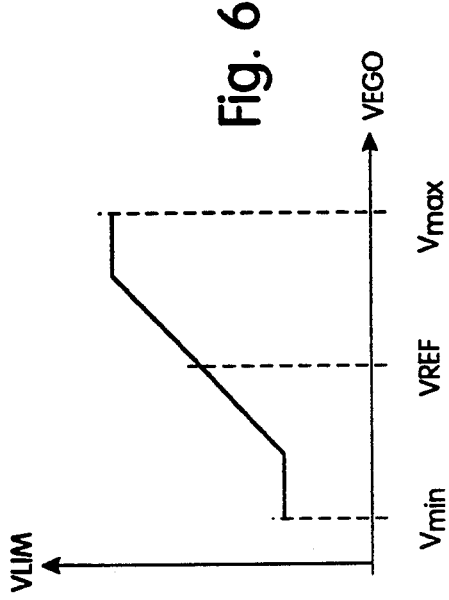
FIG. 6 is a graph showing voltage output of a limiter used in accordance with an embodiment of the invention.

In another embodiment of the invention, a limiting block may be substituted for the second comparator 202. Voltage characteristic of the limiter shown in FIG. 6 has a gain of 1 in the vicinity of the reference voltage, and its upper and lower limits are set symmetrically about the reference voltage and do not extend beyond minimum $V_{min}$ and maximum $V_{max}$ voltages of EGO sensor output signal VEGO. Calculation of air/fuel ratio correction amount LAMCOR for this embodiment is similar to the main embodiment. In this case, steps 516, 518, and 520 of FIG. 5 are replaced by the calculation of value LIM for the limiter, corresponding to the value of COMP2 in the main embodiment. If conditions are not met for downstream closed loop control, then LIM is set equal to zero and DIF equals COMP1. The summing block then computes output value SUM:

$$SUM = DIF + K \cdot LIM + BIAS$$

which equation should be recognized to correspond to (Eqn. 2) of step 522 in the main embodiment.

It is understood that during different engine operations, specifically, at different speeds and loads, control system calibratable parameters may require readjustments for optimal control. These parameters include jumpback H and ramp G of PI controller 210, time constant $T_d$ of high pass filter 204, gain K of gain block 206, and bias signal BIAS to summing block 208. To achieve a recalibration of all or any combination of said parameters, a number of functions or tables (e.g., table 214 in FIG. 2) with engine speed and load as inputs may be incorporated in the flowcharts shown in FIG. 5 and 7. It is also understood that certain measures, such as time delays or low pass filters, may be employed to protect the control system from effects of high frequency EGO sensor switching. Such modifications can be readily incorporated into various preferred embodiments of the invention by those skilled in the art in view of the present disclosure.

Operation of the system for periodic catalytic converter monitoring while continuing to control fuel flow to the engine is now described with reference to FIGS. 2, 7, 8 and 9. A test interval typically will commence during substantially steady state, engine operation and will span about 20 seconds and multiple attempts may be required before a valid test is completed. One or multiple valid tests may be run during a given period of continuous operation. A monitoring test is commenced during normal closed loop operation. The term "periodic" is used to mean occasionally or intermittently, for example, once (or more often) each time engine operation is restarted after a period of non-operation. In that regard, reference to initiating the test period during substantially steady state operation of the engine means starting the test period when the engine is in dual closed loop operation, not necessarily that all engine operating parameters are constant, and not necessarily that the engine will remain at steady state during the entire planned test period.

At the beginning of the test, the signal DIF from comparator 200 and high pass filter 204 is replaced by a test signal SIG from a signal generator, shown as function generator 300 in FIG. 2. Thus, function generator 300 sends test signal SIG to summing block 208. The test signal SIG preferably is any periodic function with zero mean value and a frequency higher than the limit cycle frequency for closed loop fuel control using only downstream EGO sensor 130. The test signal can in this sense be referred to as a high frequency signal. Its frequency is preferably pre-set at or about 1.5 Hz. Preferred test signal functions include, for example, a sinusoidal wave function, a triangle wave function, a pulse train, etc.

Figure 7:
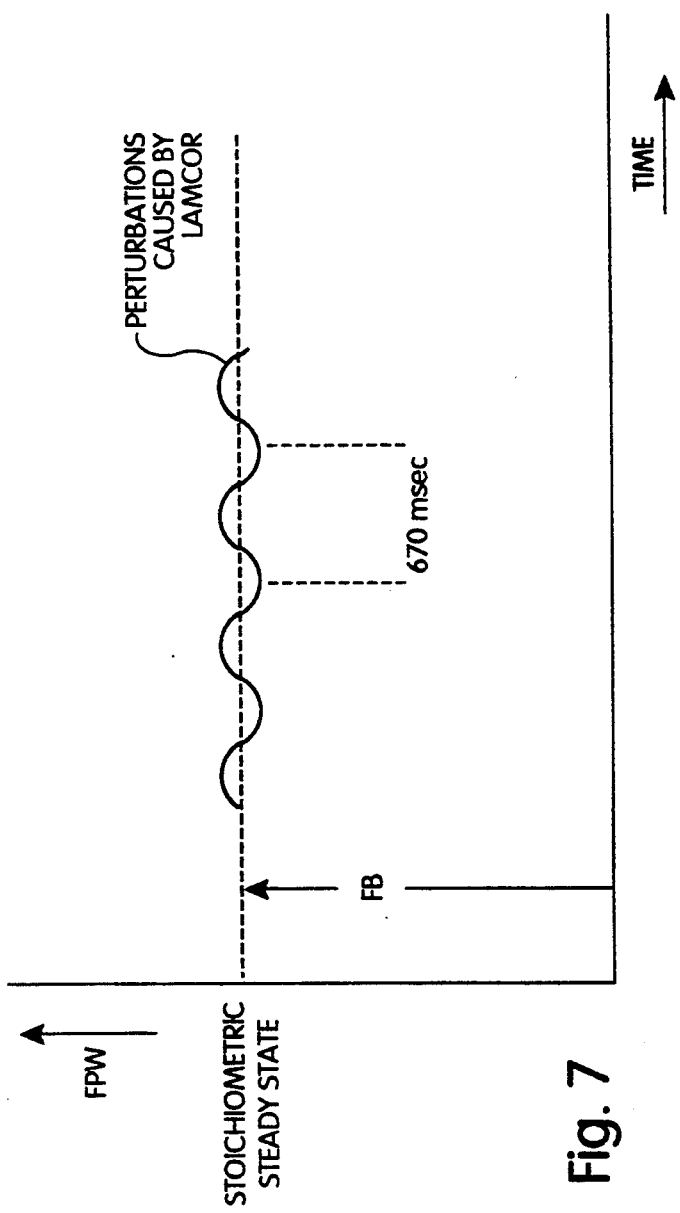
FIG. 7 is a graph showing perturbations in fuel flow rate FPW caused by LAMCOR as a result of periodic test signal SIG during catalytic converter monitoring mode of the apparatus of FIG. 1.

It should be recognized that the impact of the test signal, and the test mode operation, on actual engine performance will generally be imperceptible to the operator. As illustrated in FIG. 7 (not to scale), the value of FPW sent to injector drivers 112 is primarily determined by the value of FB. The LAMCOR signal perturbs the value of FB essentially symmetrically, and only slightly, about its steady state stoichiometric value. A frequency of 1.5 Hz for test signal SIG is shown to yield a corresponding 670 msec period for the perturbations.

After several seconds of injecting the high frequency test signal in place of the processed signal from the upstream EGO sensor, typically spanning several cycles through the test mode flow path, the control system locks up to the test signals. That is, the output signal from downstream EGO sensor 130 and the output from PI controller 210 will oscillate with the same frequency as the test signal. Significantly, the amplitude of the oscillations of the signal VEGO2 from downstream EGO sensor 130 varies as a function of catalytic converter efficiency. Accordingly, an appropriate value of the VEGO2 signal during the test interval can be measured to determine the condition of the catalytic converter. The measured value is compared to a stored value corresponding to a minimum acceptable catalytic converter efficacy to determine the condition of the catalytic converter, preferably on a pass/fail basis. Various suitable alternative calculations based on the amplitude of the VEGO2 signal during the test period (following frequency lock-up with the test signal SIG) will be readily apparent to those skilled in the art in view of this disclosure. One preferred calculation is estimated deviation of VEGO2 from stoichiometry. One suitable estimation function is the integral, over the test interval, of an absolute value of VEGO2 deviation from stoichiometry. Another suitable estimation function is variance or standard deviation of VEGO2. The function calculations may also include signal processing techniques, for example, high pass filters or band pass filters to remove low frequency transients from the VEGO2 signal to improve deviation estimates.

In the preferred embodiment illustrated, EGO function calculation block 302 estimates deviation of VEGO2 from stoichiometry. Similar to the EGO function calculation in block 302, fuel function calculation block 304 estimates deviation of fuel flow from the steady state value due to control actions in response to the periodic test signal SIG. In this regard, it will be recognized that during the test interval LAMCOR represents deviations of FPW from base open loop fuel flow FB caused by test signal SIG from the function generator 300. Although function calculation blocks 302 and 304 are similar in the process step each performs, their respective estimation function may differ from each other. Thus, for example, one may employ an integration function and the other a variance or standard deviation function. Preferably, both employ the integral of VEGO2 deviation. Suitably accurate estimation is achieved, for example, integrating signal values for 20 msec. segments of the test interval (i.e., as discussed above, for the portion of the test interval which follows frequency lock-up).

At expiration of the test interval, the final values calculated by blocks 302 and 304 are received as inputs to decision block 306. Decision block 306 weights or normalizes the final values, for example, by dividing the EGO function value by the fuel function value. As mentioned above, normalizing the EGO2 final test value, as in the present preferred embodiment using the fuel function block and its output value to normalize the test results, decreases sensitivity to driving conditions, etc. This weighting or normalizing improves the accuracy of the test by mitigating errors due to driving conditions, controller calibration and slow transients in steady state conditions. It should be recognized, however, that this is not essential in all embodiments and, optionally the fuel function calculation block could be omitted.

Decision block 306 compares the normalized test result to a stored value corresponding to minimum acceptable catalytic converter efficiency. If the test result exceeds the preset value, a failure signal is generated. Optionally, the failure signal may trigger a light and/or sound alarm to the vehicle operator. Also optionally, a pass signal may be generated when the test result does not exceed the preset value.

Figure 8:
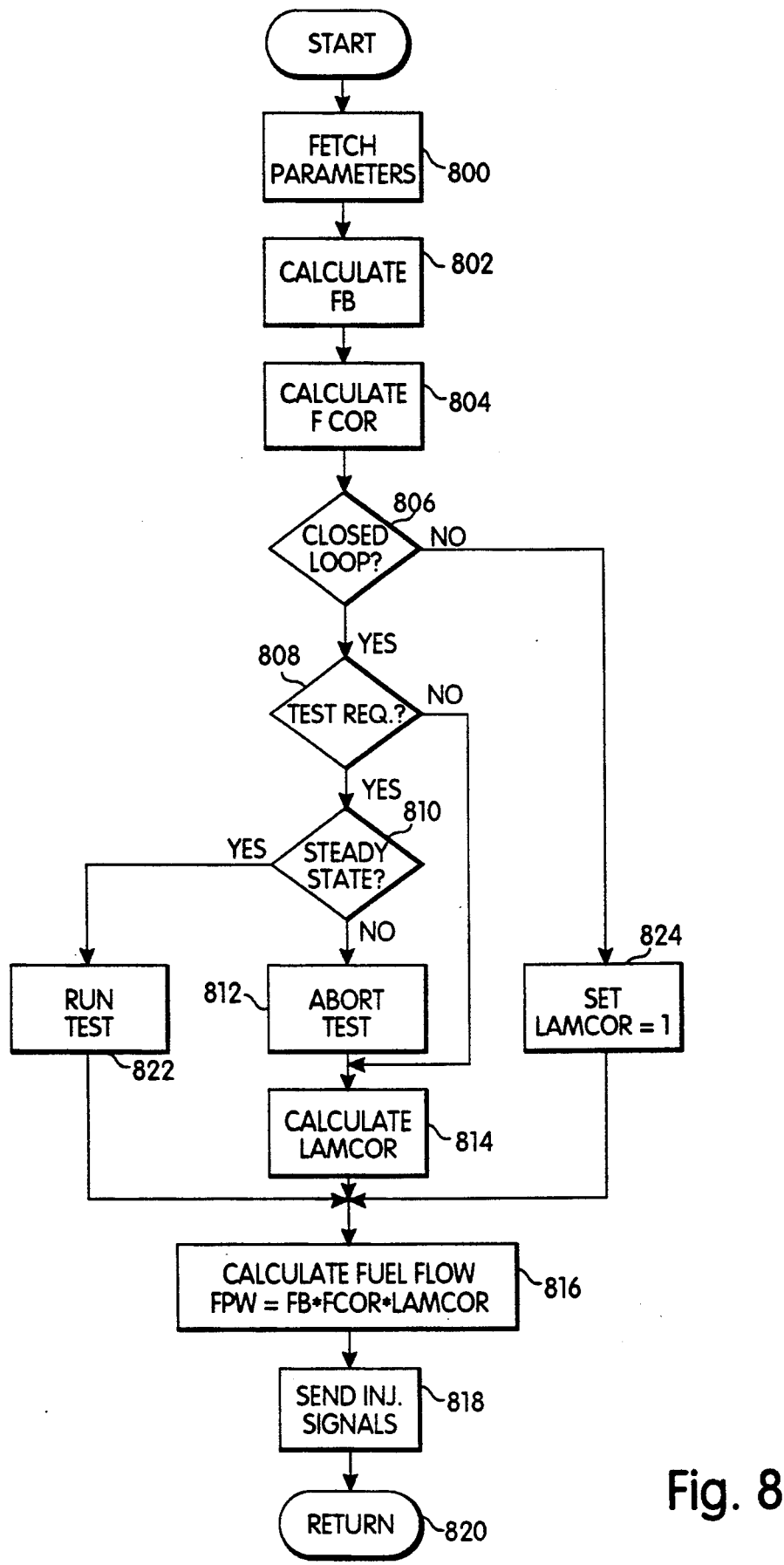
FIG. 8 is a flow chart illustrating process steps to calculate fuel flow rate and perform catalyst monitoring in accordance with the embodiment of FIGS. 1 and 2.

The operation of microcomputer 100 in controlling fuel flow to the engine 102 during catalytic converter monitoring mode is illustrated by the flowchart of FIG. 8. At the start of each sampling interval, engine parameters are fetched in step 800. Engine speed and load are computed in the conventional manner from crank position signal CA and mass air flow signal MAF. During step 802, base open loop fuel injection amount FB is determined by look-up and interpolation of speed/load table from ROM 106 storage. At step 804, fuel correction amount FCOR is calculated based, for example, on engine warm-up conditions, intake air temperature TA, cooling water temperature TW, battery voltage, and the like. Some engine operation conditions, such as wide open throttle or prolonged idle may require open loop fuel control even after other closed loop conditions are met. Thus, closed loop requirements are checked in step 806. If closed loop fuel control requirements are not met, step 824 sets air/fuel ratio correction amount LAMCOR to 1. Step 816 calculates final fuel flow FPW based on the main fuel flow equation as discussed above for normal operation mode. Fuel injectors are energized in step 818, and step 820 returns to the main microcomputer routine.

If closed loop fuel control requirements are found to be met in step 806, step 808 checks whether a catalytic converter test is required. A test may be required, for example, if a test has not been successfully completed during the present operation of the engine since start-up following a period of non-operation. If a test is required, steady state conditions are verified in step 810. In addition, step 810 may check whether additional pre-conditions are met. Applicable government regulations may specify and define steady vehicle and engine speed and load conditions, upstream and downstream EGO sensor warm-up, etc. If all such conditions are not met, step 812 aborts the test. Step 814 then calculates the air/fuel ratio correction amount for dual EGO sensor closed loop fuel control as discussed above for normal operation mode. If conditions in step 810 are met, the catalytic converter efficiency test is conducted by step 822, followed by steps 816, 818 and 820, as above. The return step 820 may return the process directly to the start block immediately preceding block 800 or to the main routine for cycling through to block 800 in due course.

Figure 9:
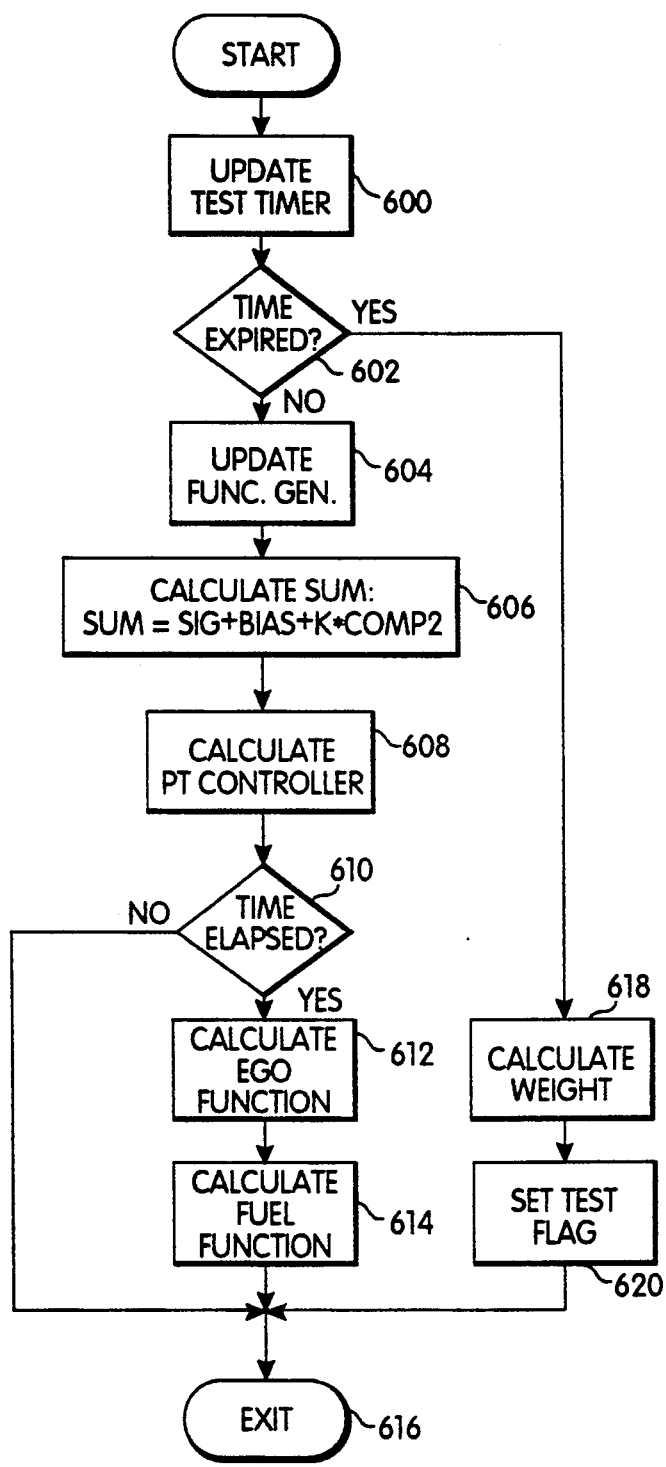
FIG. 9 is a flow chart illustrating process steps performed in conducting an efficacy test of the catalytic converter of the embodiment of FIGS. 1 and 2 in accordance with the overall fuel flow control process illustrated in the flow chart of FIG. 8.

The operation of microcomputer 100 in step 822 for conducting a catalytic converter efficiency test is illustrated in the flowchart of FIG. 9. Applicable regulations may require that the test be completed in a specified time period, for example, 20 seconds. Preferably, therefore, microcomputer 100 comprises a timer to monitor the time elapsed since test initiation. The timer is updated in step 600. Step 602 checks whether the preset test duration has expired. If the test duration time has not expired, step 604 updates function generator 300 which provides periodic test function SIG. Then step 606 calculates the output signal of summing block 208; SUM=SIG+K*COMP2+BIAS. The output SUM of summing block 208 is input to PI controller 210, and the output of PI controller 210, LAMCOR, is calculated in step 608. As mentioned above, some time, typically about 5 seconds, is required for the control system to lock up to the test signal frequency and stabilize transient conditions before engaging in calculation of EGO and fuel functions. Accordingly, the elapsed time since test initiation is checked in step 610. When elapsed time has exceeded a preset value, typically 5 seconds, steps 612 and 614 calculate the EGO function and the fuel function, as described above regarding calculation blocks 302 and 304, respectively, in FIG. 2. Those skilled in the art will recognize that frequency comparing means can be provided to determine frequency lock up in place of elapsed time measure in step 610. Step 616 provides exit to step 816 in the flowchart of FIG. 8. The process may thereafter be repeated in one or more additional cycles. After the test interval expires, as determined by step 602, step 618 normalizes the EGO function, using the fuel function, and (if called for) generates a failure signal, as described above in connection with decision block 306 in FIG. 2.

The reading of the foregoing description of certain preferred embodiments by those skilled in the art will bring to mind further alterations and modifications within the spirit and scope of the invention. It is intended that the scope of the following claims include all such alterations and modifications.

I claim:

1. An apparatus for monitoring catalytic converter efficiency in treating exhaust gas from an internal combustion engine, comprising:

a catalytic converter;
   an exhaust conduit means for passing downstream exhaust gas from the catalytic converter;
   a switch-type downstream EGO sensor mounted for exposure to the downstream exhaust gas in said conduit means for generating a downstream output signal corresponding to the oxygen content level of the downstream exhaust gas;
   test signal generator means for generating a zero mean value test signal during a test operation mode of the apparatus;
   control signal means which, during the test operation mode, receives the downstream output signal and the test signal for generating a fuel flow control signal;
   fuel control means for controlling the air/fuel ratio at which fuel is supplied to the engine in response to the fuel flow control signal; and
   comparison means for comparing a value of the downstream output signal during test operation mode to a stored value corresponding to a minimum acceptable efficiency of the catalytic converter, and for generating a failure signal when the comparison indicates catalytic converter efficiency below said minimum acceptable efficiency.

2. The apparatus for monitoring catalytic converter efficiency in accordance with claim 1 wherein the test signal is a periodic function having a frequency higher than the natural frequency of the limit cycle of said switch-type sensor.

3. The apparatus for monitoring catalytic converter efficiency in accordance with claim 1 also having a normal operation mode and further comprising:

upstream exhaust conduit means for passing upstream exhaust gas from the engine to the catalytic converter; and
   a switch-type upstream EGO sensor mounted for exposure to upstream exhaust gas in the upstream exhaust conduit means for generating an upstream output signal corresponding to oxygen content level of the upstream exhaust gas;
   wherein the control signal means, during normal operation mode, is for receiving the downstream and upstream output signals as inputs for generating said fuel flow control signal to said fuel control means.

4. The apparatus for monitoring catalytic converter efficiency in accordance with claim 3 wherein the test signal generator means is for generating a sinusoidal test signal.

5. The apparatus for monitoring catalytic converter efficiency in accordance with claim 3 wherein the comparison means is for calculating said value of the downstream output signal as the integral over a test interval of an absolute value of the downstream output signal deviation from stoichiometry, divided by the integral over the test interval of the fuel flow control signal deviation from stoichiometry.

6. An apparatus for controlling the air/fuel ratio of an air and fuel mixture for an internal combustion engine, for treatment of exhaust gas from the internal combustion engine, and for periodically monitoring catalytic converter efficiency in the treatment of the exhaust gas, the apparatus having a normal operation mode and a test operation mode and comprising:

A) fuel control means for controlling the air/fuel ratio at which fuel is supplied to the engine in response to a fuel flow control signal;
   B) exhaust means comprising a catalytic converter, first exhaust conduit means for passing upstream exhaust gas from the engine to the catalytic converter, and second exhaust conduit means for passing downstream exhaust gas from the catalytic converter;
   C) a first EGO sensor means mounted to said exhaust means for exposure to said upstream exhaust gas for generating a first EGO signal having a value corresponding to oxygen content level in the upstream exhaust gas;
   D) a second EGO sensor means mounted to said exhaust means for exposure to said downstream exhaust gas for generating a second EGO signal having a value corresponding to oxygen content level in the downstream exhaust gas; and
   E) microprocessor means comprising:
      first signal processing means for receiving the first EGO signal and a first reference signal corresponding to the value of the first EGO signal for stoichiometric air/fuel ratio, and for generating a first signal based on a comparison thereof indicative of the air/fuel ratio;
      second signal processing means for receiving the second EGO signal and a second reference signal corresponding to the value of the second EGO signal for stoichiometric air/fuel ratio, and for generating a second signal based on a comparison thereof indicative of a condition of the downstream exhaust gas;
      test signal generator means to generate a zero mean value periodic function test signal replacement for the first signal during said test operation mode;
      summing block means for receiving and summing at least,
      in normal operation mode, the first signal and the second signal for generating a sum signal, and
      in test operation mode, the test signal and the second signal for generating the sum signal;
      proportional and integral controller means for receiving at least the sum signal and generating a LAMCOR signal corresponding to a desired air/fuel ratio correction amount for the fuel mixture;
      fuel flow calculation means for receiving at least the LAMCOR signal and for generating the fuel flow control signal to the first control means corresponding to a desired fuel flow to the internal combustion engine; and
      comparison means for conducting a comparison of a value of the second output signal during said test operation mode to a stored value corresponding to a minimum acceptable efficiency of the catalytic converter, and generating a failure signal when the comparison indicates catalytic converter efficiency below said minimum acceptable efficiency.

7. A method of monitoring catalytic converter efficacy in treating exhaust gas from an internal combustion engine, comprising the steps of:
   generating an EGO signal having a value corresponding to oxygen content levels in the exhaust gas downstream of the catalytic converter to a control signal means;
   operating a control signal means for generating a fuel control signal to a fuel control means for controlling the air/fuel ratio at which air and fuel are supplied to the engine;
   generating a zero mean value periodic function test signal, during a test period, the control signal means generating said fuel control signal during said test period based at least in part on said EGO signal and said test signal;
   generating a normalized value of the EGO signal; and
   comparing said normalized value of the EGO signal to a stored value corresponding to a minimum acceptable efficiency co the catalytic converter.

8. The method of monitoring catalytic converter efficiency in accordance with claim 7 further comprising the step of generating a failure signal when the normalized value of the EGO signal indicates catalytic converter efficiency below said minimum acceptable efficiency.

9. A method of monitoring catalytic converter efficiency in treating exhaust gas from an internal combustion engine, comprising the steps of:
   generating an EGO signal having a value corresponding to oxygen content levels in the exhaust gas downstream of the catalytic converter to a control signal means;
   operating the control signal means for generating a fuel control signal to a fuel control means for controlling the air/fuel ratio at which air and fuel are supplied to the engine;
   generating a zero mean value periodic function test signal during a test period, the control signal means generating said fuel control signal during said test period based at least in part on said EGO signal and said test signal; and
   comparing a normalized value of the EGO signal to a stored value corresponding to a minimum acceptable efficiency of the catalytic converter, wherein in the step of comparing said normalized value of the EGO signal, said value of the EGO signal is normalized by weighting for fuel flow variance.

10. A method of monitoring catalytic converter efficiency in treating exhaust gas from an internal combustion engine, comprising the steps of:
   generating an EGO signal having a value corresponding to oxygen content levels in the exhaust gas downstream of the catalytic converter to a control signal means;
   operating the control signal means for generating a fuel control signal to a fuel control means for controlling the air/fuel ratio at which air and fuel are supplied to the engine;
   generating a zero mean value periodic function test signal during a test period, the control signal means generating said fuel control signal during said test period based at least in part on said EGO signal and said test signal; and
   comparing a normalized value of the EGO signal to a stored value corresponding to a minimum acceptable efficiency of the catalytic converter, wherein in the step of comparing said normalized value of the EGO signal, said value of the EGO signal is an integral over a test interval of deviation from stoichiometry of an absolute value thereof, normalized by division by an integral over the test interval of deviation from stoichiometry of the fuel control signal.

* * * * *